(12) United States Patent
Rummel et al.

(10) Patent No.: US 10,470,610 B2
(45) Date of Patent: Nov. 12, 2019

(54) FLUE AND VENT GRILLING SYSTEM

(71) Applicants: Randy Rummel, Huntington Beach, CA (US); Daniel Nichols, Huntington Beach, CA (US); Mark Steinman, Huntington Beach, CA (US)

(72) Inventors: Randy Rummel, Huntington Beach, CA (US); Daniel Nichols, Huntington Beach, CA (US); Mark Steinman, Huntington Beach, CA (US)

( * ) Notice: Subject to any disclaimer, the term of this patent is extended or adjusted under 35 U.S.C. 154(b) by 848 days.

(21) Appl. No.: 15/040,918

(22) Filed: Feb. 10, 2016

(65) Prior Publication Data

US 2017/0224157 A1 Aug. 10, 2017

(51) Int. Cl.
*A47J 37/07* (2006.01)
(52) U.S. Cl.
CPC ....... *A47J 37/0704* (2013.01); *A47J 37/0786* (2013.01)

(58) Field of Classification Search
CPC .... A47J 37/0704; A47J 37/0786; A47J 37/07; A47J 36/06
See application file for complete search history.

(56) References Cited

U.S. PATENT DOCUMENTS

| | | | | |
|---|---|---|---|---|
| 2009/0308373 | A1* | 12/2009 | Scott | A47J 36/06 126/25 R |
| 2011/0283990 | A1* | 11/2011 | Walters | A47J 37/0704 126/25 R |
| 2013/0008427 | A1* | 1/2013 | Ahmed | A47J 36/06 126/25 R |

* cited by examiner

*Primary Examiner* — Alfred Basichas
(74) *Attorney, Agent, or Firm* — John D. Tran; Rhema Law Group

(57) ABSTRACT

A method and apparatus can include: a body; a hood covering coupled to the body, the hood covering including an outer shell, the outer shell including an exhaust port; a flue attached to the outer shell, the flue including a flue output and a flue input; and a grating mounted within the body.

18 Claims, 4 Drawing Sheets

FLUE AND VENT GRILLING SYSTEM

TECHNICAL FIELD

This disclosure relates to grilling technology, more particularly grilling technology implementing a flue and vent.

BACKGROUND

A common method of cooking foods is grilling which is also known as barbecuing. A heat source can be placed below or next to food that is being cooked. Typically the heat source can produce a radiant heat, and a convection heat along with smoke that can flavor the food.

The heat sources and grill rack assemblies are typically enclosed next to each other in multiple sections into a metal housing that comprise the grilling appliance. Most of these grilling appliances have hinged covers that can be opened and closed over the grilling sections, some are built without any lids or covers. The convection gasses and smoke typically rises up through an internal volume of the grill and exit through a top vent in the hinged cover.

These grilling appliances are commonly used for residential or commercial restaurant use and can be used in an indoor or outdoor area. These appliances are intended for the cooking of foods such as meats and vegetables using natural gas or propane.

In the development of grilling appliances, many problems have arisen including moisture, heat, and smoke to escaping rapidly. Prior developments allowing moisture, heat, and smoke to escape rapidly decreases cooking performance by creating hot spots, cold spots, a dry cooking environment, and reducing the amount of exposure food has to a flavoring smoke. Further, allowing moisture, heat, and smoke to escape rapidly decreases efficiency requiring more fuel to be used, and more cooking time.

Prior developments in grilling appliances directed and vented the moisture, heat, and smoke from the heat source past the food and directly out of the top. Solutions to these problems have been long sought but prior developments have not taught or suggested any complete solutions, and solutions to these problems have long eluded those skilled in the art. Thus there remains a considerable need for devices and methods providing safer and more effective grilling appliances.

SUMMARY

A flue and vent grilling system and methods, providing significantly increased moisture, heat, and smoke management increasing cooking efficiency, moisture retention, and smoke flavoring. The flue and vent grilling system and methods can include: a body; a hood covering coupled to the body, the hood covering including an outer shell, the outer shell including an exhaust port; a flue attached to the outer shell, the flue including a flue output and a flue input; and a grating mounted within the body.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The grilling system is illustrated in the figures of the accompanying drawings which are meant to be exemplary and not limiting, and in which.

DETAILED DESCRIPTION

Figure 1:
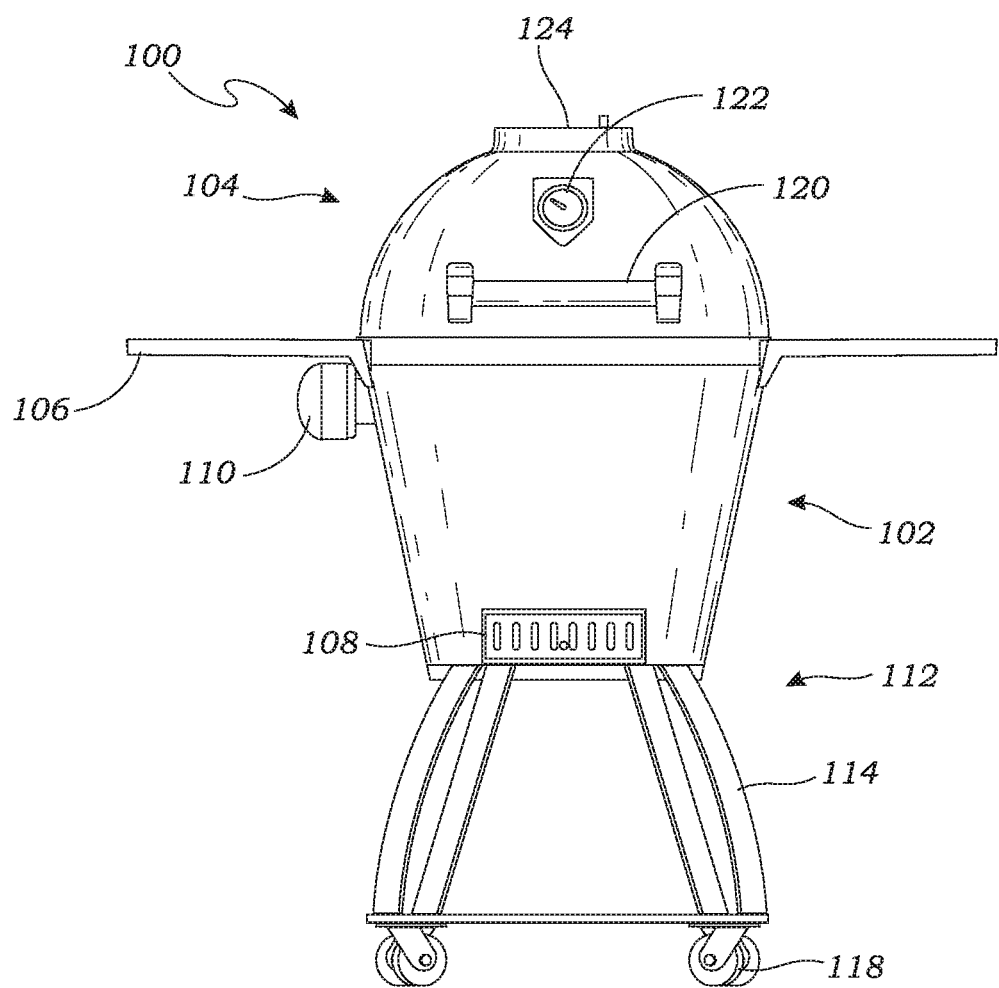
FIG. 1 is a side view of an embodiment of a grilling system.

In the following description, reference is made to the accompanying drawings that form a part hereof, and in which are shown by way of illustration, embodiments in which the grilling system may be practiced. It is to be understood that other embodiments may be utilized and structural changes may be made without departing from the scope of the grilling system.

When features, aspects, or embodiments of the grilling system are described in terms of steps of a process, an operation, a control flow, or a flow chart, it is to be understood that the steps can be combined, performed in a different order, deleted, or include additional steps without departing from the grilling system as described herein.

The grilling system is described in sufficient detail to enable those skilled in the art to make and use the grilling system and provide numerous specific details to give a thorough understanding of the grilling system; however, it will be apparent that the grilling system may be practiced without these specific details. In order to avoid obscuring the grilling system, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGs.

As used herein, the term system is defined as a device or method depending on the context in which it is used. For expository purposes, the term "horizontal" as used herein is defined as a plane parallel to the top plane or surface of the grating in a high or elevated position, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane.

Referring now to FIG. 1, therein is shown a side view of an embodiment of a grilling system 100. The grilling system 100 is depicted having a body 102 with a hood covering 104 coupled thereto. The hood covering 104 can be moveable and can hinge to provide access inside the grilling system 100.

Beside the hood covering 104 and extending out from the body 102 are food preparation extensions 106. Near the bottom of the body 102, the body is depicted as having adjustable input vents 108 for controlling the amount of air that can be input into the grilling system 100.

The air allowed into the grilling system 100 from the adjustable input vents 108 can control the amount of heat generated within the grilling system 100. Below the food preparation extensions 106 and coupled to the body 102 an optional rotisserie motor 110 can be mounted.

The body 102 can be attached to a cart 112. The cart 112 can be comprised of legs 114 coupled to a base 116. The base 116 can be coupled to wheels 118.

The hood covering 104 can include a handle 120 in the front of the hood covering 104. The handle 120 can be used to open the hood covering 104 and separate it from the body 102.

The hood covering 104 can further include a thermometer 122 on the hood covering 104 above the handle 120. At the top of the hood covering 104, a vent 124 is depicted. The vent 124 can allow hot gasses and smoke to be exhausted from the grilling system 100.

Figure 2:
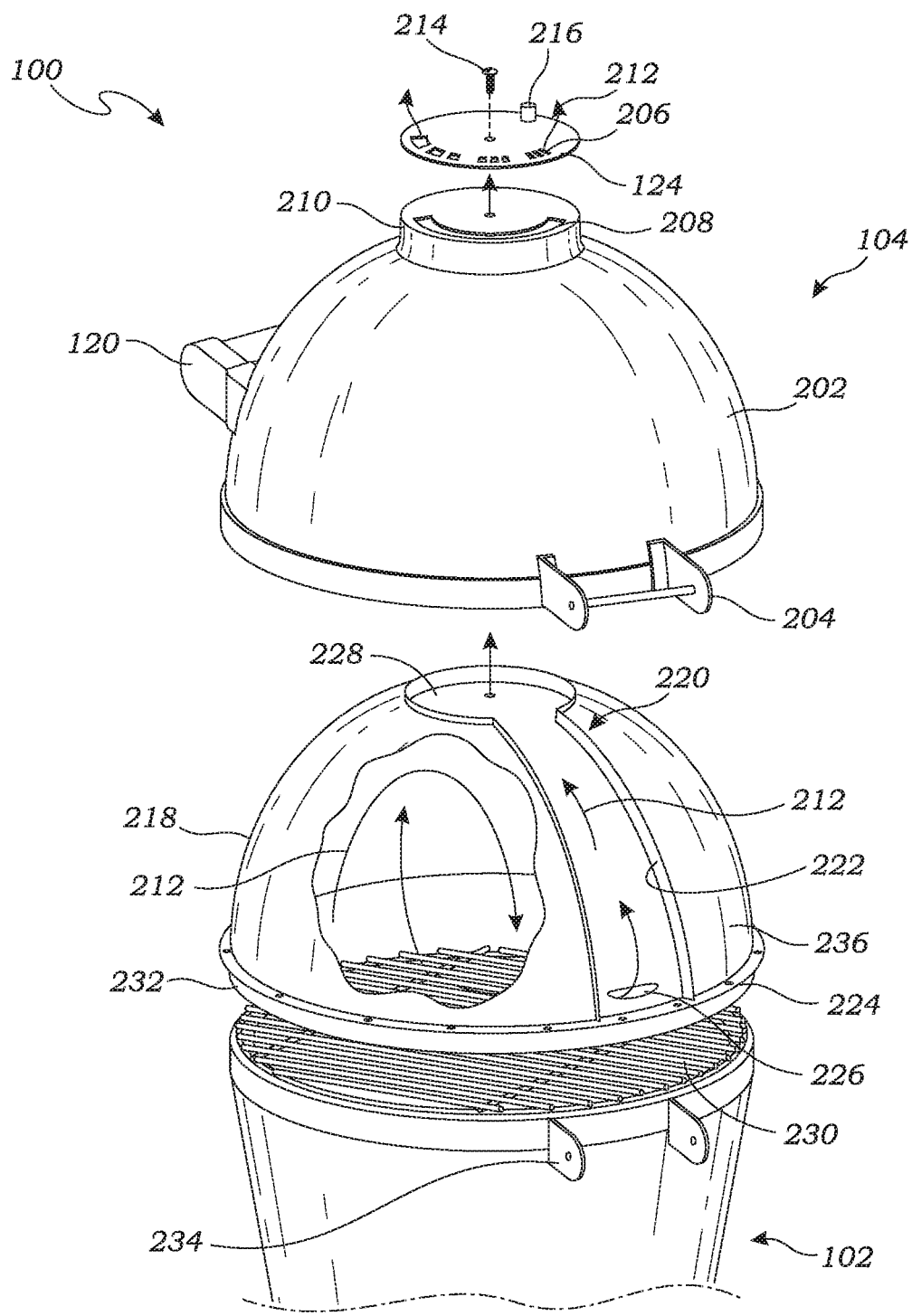
FIG. 2 is an isometric exploded view of the grilling system of FIG. 1.

Referring now to FIG. 2, therein is shown an isometric exploded view of the grilling system 100 of FIG. 1. The grilling system 100 is depicted having the hood covering 104 in multiple pieces.

The hood covering 104 can have an outer shell 202. The outer shell 202 can include an upper hinge 204 and the handle 120 coupled thereto.

The vent 124 is depicted above the hood covering 104 with different sized openings 206. The vent 124 can cover an exhaust port 208 within the outer shell 202 of the hood covering 104. The exhaust port 208 can be positioned at a top portion of a protrusion 210 of the outer shell 202.

The openings 206 can be positioned over the exhaust port 208. The openings 206 can be of different sizes and can control the flow of the hot gasses 212 out of the grilling system 100 by rotating the vent 124 about a screw 214 and opening or closing the exhaust port 208.

The hot gasses 212 can be the cooking gasses, smoke, and other exhaust gasses from the grilling system 100. When the openings 206 in the vent 124 are positioned over the exhaust port 208 to produce less restriction to the hot gasses 212 the grilling system 100 will get hotter. When the openings 206 in the vent 124 are positioned over the exhaust port 208 to produce more restriction to the hot gasses 212, the grilling system 100 will get cooler and could even be used to extinguish a heat source or cooking flame.

The vent 124 can include a vent handle 216 on an edge of the vent 124. The vent handle 216 can be used to rotate the vent 124.

Below the outer shell 202 the grilling system 100 is shown having an inner shell 218. It is contemplated that the inner shell 218 and the outer shell 202 can be stainless steel, other type of sheet metal. It is further contemplated that the grilling system 100 could be implemented without the inner shell 218.

Between the inner shell 218 and the outer shell 202 a flue 220 is depicted. For descriptive clarity, the flue 220 as used herein means a duct, a tube, a shaft, a vent, a pipe, a passage, a channel, a conduit or a chimney.

The flue 220 can include flue walls 222 that extend along an entire height of the inner shell 218 from a lower flange 224 to an upper surface of the inner shell 218. The flue 220 is shown extended along an entire height of the hood covering 104 from a bottom area of the hood covering 104 to the exhaust port, the flue input 226 is shown near the bottom area of the hood covering 104 while the exhaust port is shown near a top of the hood covering. The flue walls 222 extend from the exhaust port to the flue input 226. The flue walls 222 further extend from the surface of the inner shell 218 out away from the inner shell 218 toward the outer shell 202, that is the flue walls 222 can be between the inner shell 218 and the outer shell 202 of the hood covering 104 forming an entirely internal component between the inner shell 218 and the outer shell 202.

When the outer shell 202 is placed on the inner shell 218 the flue walls 222 can extend from the surface of the inner shell 218 to the inner surface of the outer shell 202 fully sealing the flue 220 between the inner shell 218 and the outer shell 202.

The hot gasses 212 can be seen circulating within the inner shell 218 moving into the flue 220 through a flue input 226. The hot gasses 212 are depicted moving up through the flue 220 toward a flue output 228.

The flue output 228 can be a portion of the flue 220 having the flue walls 222 widening into a circle formation that can mate with the protrusion 210 and provide a seal between the flue walls 222 and the outer shell 202. The hot gasses 212 are depicted rising up through the flue output 228, out through the exhaust port 208 and finally through the openings 206 in the vent 124.

The flue input 226 is depicted as an opening in the inner shell 218 that allows the hot gasses 212 to flow from within the inner shell 218 to within the flue 220. The hood covering 104 can be mated to the body 102.

The body 102 is shown having a grating 230. The grating 230 can be the surface on which the food being cooked is placed. The flue input 226 is depicted as being placed above the grating 230 when the hood covering 104 is closed on the body 102.

In alternate embodiments, the flue input 226 can be below the grating 230 when the hood covering 104 is closed onto the body 102. Below the lower flange 224 of the inner shell 218 a gasket 232. The gasket 232 can seal the hood covering 104 to the body 102 when the hood covering 104 is closed allowing the hot gasses 212 to be managed using the flue 220 and the vent 124 alone without leakage of the hot gasses 212 from between the hood covering 104 and the body 102.

The body 102 is depicted having a lower hinge 234. The lower hinge 234 and the upper hinge 204 can be mated together. When the lower hinge 234 and the upper hinge 204 are mated together the hood covering 104 is allowed to hinge open and closed with respect to the body 102.

An insulation 236 is depicted between the inner shell 218 and the outer shell 202. It is contemplated that the insulation 236 can be optional. The insulation 236 is depicted extending from the surface of the inner shell 218 out to the same height as the flue walls 222.

It is contemplated that the insulation 236 could be optional and when not included between the inner shell 218 and the outer shell 202 only an empty space would be between the inner shell 218 and the outer shell 202. It has been discovered that not including the insulation 236 can decrease the costs and complexity of production.

Figure 3:
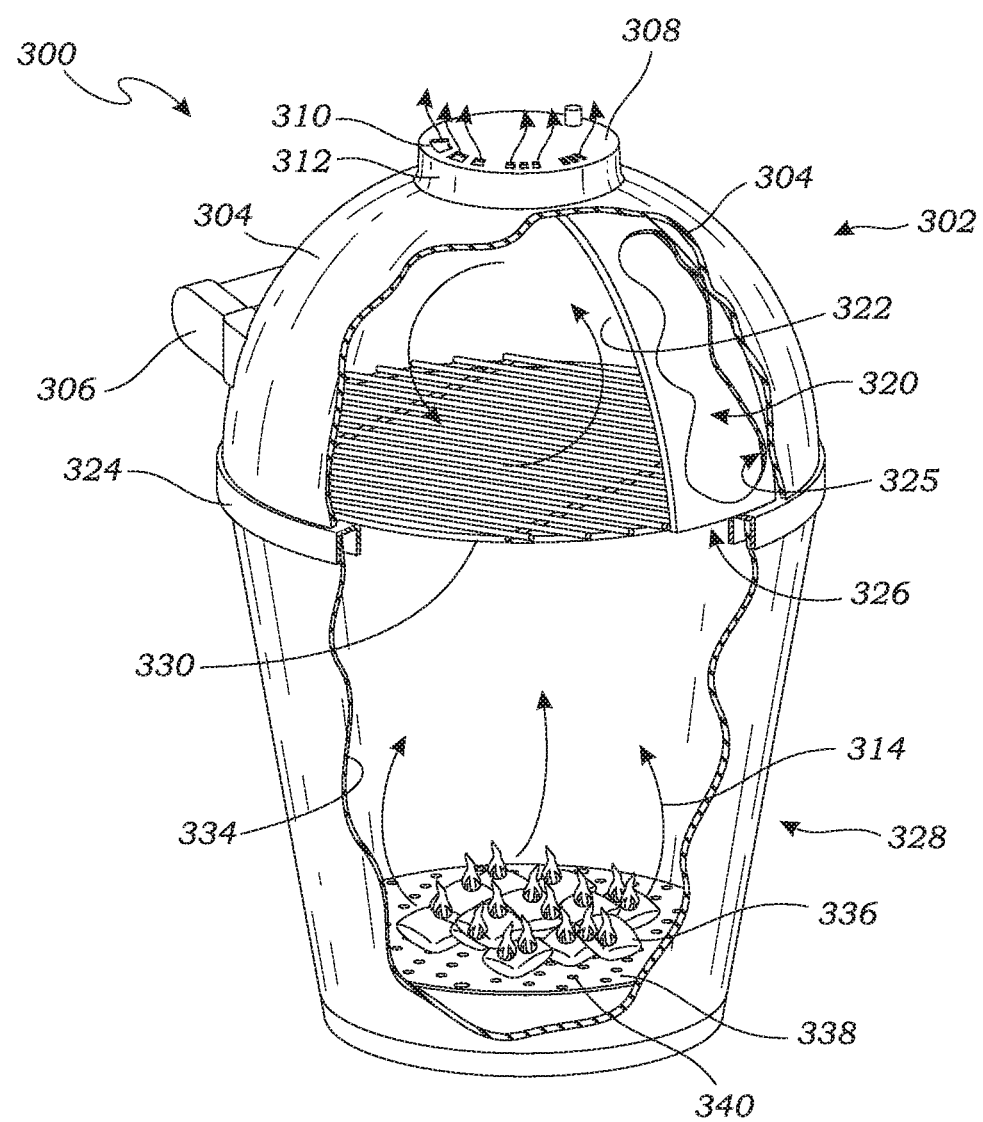
FIG. 3 is an isometric cutaway view of an alternate embodiment of a grilling system.

Referring now to FIG. 3, therein is shown an isometric cutaway view of an alternate embodiment of a grilling system 300. The grilling system 300 is depicted having a hood covering 302.

The hood covering 302 can have an outer shell 304. The outer shell 304 can be coupled to a handle 306 coupled thereto.

A vent 308 is depicted above the hood covering 302 with different sized openings 310. The vent 308 can cover an exhaust port within the outer shell 304 of the hood covering 302. The exhaust port can be positioned at a top portion of a protrusion 312 of the outer shell 304.

The openings 310 can be positioned over the exhaust port. The openings 310 can be of different sizes and can control the flow of the hot gasses 314 out of the grilling system 300 by rotating the vent 308 about a screw 314 and opening or closing the exhaust port.

The hot gasses 314 can be the cooking gasses, smoke, and other exhaust gasses from the grilling system 300. When the openings 310 in the vent 308 are positioned over the exhaust port to produce less restriction to the hot gasses 314 the grilling system 300 will get hotter. When the openings 310 in the vent 308 are positioned over the exhaust port to produce more restriction to the hot gasses 314, the grilling system 300 will get cooler and could even be used to extinguish a heat source or cooking flame.

In some contemplated embodiments, the vent 308 can include a vent handle on an edge of the vent 308. The vent handle can be used to rotate the vent 308.

Below the outer shell 304 a flue 320 is depicted attached thereto. For descriptive clarity, the flue 320 as used herein means a duct, a tube, a shaft, a vent, a pipe, a passage, a channel, a conduit or a chimney.

The flue 320 can include flue walls 322 that extend along an entire height of the outer shell 304 from a lower flange 324 to the protrusion 312 of the outer shell 304. The flue walls 322 extends inward and away from the outer shell 304.

The flue walls 322 can further include one of the flue walls 322 extending along with the outer shell 304 and attached thereto. The Flue walls 322 are depicted fully enclosing the flue 320 on all sides creating a flue as a stand-alone tube that can then be attached to the outer shell 304. The flue 320 can be affixed to the outer shell 304 with a space 325 therebetween.

It has been discovered that including the space between the outer shell 304 and the flue 320 can reduce the temperature of the outer shell 304 during operation. It is contemplated that the space 325 between the flue 320 and the outer shell 304 can be filled with insulation for further isolating the temperature of the flue from the outer shell 304.

The hot gasses 314 can be seen circulating within the hood covering 302 moving into the flue 320 through a flue input 326. The hot gasses 314 are can move up through the flue 320 toward a flue output.

The flue output can be a portion of the flue 320 having the flue walls 322 widening into a circle formation that can mate with the protrusion 312 and provide a seal between the flue walls 322 and the outer shell 304. The hot gasses 314 can rise up through the flue output, out through the exhaust port and finally through the openings 310 in the vent 308.

The flue input 326 is depicted as an open bottom of the flue 320 between the flue walls 322 and the outer shell 304. The flue input 326 allows the hot gasses 314 to flow from within the hood covering 302 to within the flue 320. The hood covering 302 can be mated to a body 328.

The body 328 is shown having a grating 330. The grating 330 can be the surface on which the food being cooked is placed. The flue input 326 is depicted as opening below the grating 330 when the hood covering 302 is closed on the body 328.

An insulation 334 is depicted on an interior surface of the outer shell 304. It is contemplated that the insulation 334 can be optional. The insulation 334 is depicted extending from the inner surface of the outer shell 304 out to the same height as the flue walls 322.

Within the body 328, a heat source 336 can be seen producing a fire and the hot gasses 314. The heat source 336 can be placed on a burn surface 338 mounted within the body 328. The burn surface 338 is contemplated to form a compression fit with the body 328 for supporting the heat source 336. The burn surface is depicted with air holes 340 for allowing air to flow to the heat source 336.

The grilling system 300 is depicted without an inner shell. It has been discovered that the grilling system 300 without an inner shell can reduce production costs and complexity.

Figure 4:
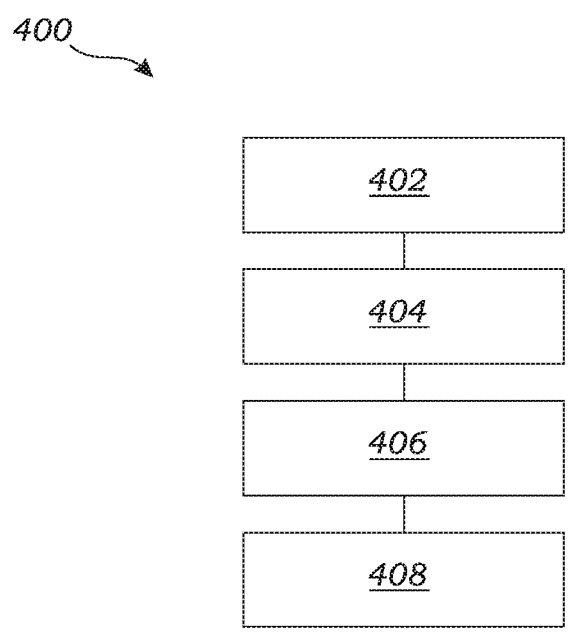
FIG. 4 is a method of manufacturing the grilling system.

Referring now to FIG. 4, therein is shown a block diagram 400 for a method of manufacturing the grilling system. The method can include providing a body in a block 402; coupling a hood covering to the body, the hood covering including an outer shell, the outer shell including an exhaust port in a block 404; attaching a flue to the outer shell, the flue including a flue output and a flue input in a block 406; and mounting a grating within the body in a block 408.

Thus, it has been discovered that the grilling system furnishes important and heretofore unknown and unavailable solutions, capabilities, and functional aspects.

The resulting configurations are straightforward, cost-effective, uncomplicated, highly versatile, accurate, sensitive, and effective, and can be implemented by adapting known components for ready, efficient, and economical manufacturing, application, and utilization.

While the grilling system has been described in conjunction with a specific best mode, it is to be understood that many alternatives, modifications, and variations will be apparent to those skilled in the art in light of the preceding description.

Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A grilling system comprising:
   a body;
   a hood covering coupled to the body, the hood covering including an outer shell, the outer shell including an exhaust port;
   an inner shell coupled to the outer shell;
   a flue attached to the outer shell, the flue including a flue wall, a flue output, and a flue input, the flue extended along an entire height of the hood covering from a bottom area of the hood covering to the exhaust port, the flue input near the bottom area of the hood covering, the exhaust port near a top of the hood covering, the inner shell forming a portion of the flue, the flue wall extending from the exhaust port to the flue input, and the flue wall being between the inner shell and the outer shell forming an entirely internal component between the inner shell and the outer shell; and
   a grating mounted within the body.

2. The system of claim 1 further comprising an insulation mounted between the outer shell and the inner shell.

3. The system of claim 1 wherein the flue input is positioned above the grating.

4. The system of claim 1 wherein the flue input is positioned below the grating.

5. A grilling system comprising:
   a body;
   a hood covering coupled to the body, the hood covering including an outer shell, the outer shell including an exhaust port;
   an inner shell coupled to the outer shell;
   a flue attached to the outer shell, the flue including a flue wall, a flue output, and a flue input, the flue extended along an entire height of the hood covering from a bottom area of the hood covering to the exhaust port, the flue input near the bottom area of the hood covering, the exhaust port near a top of the hood covering, the inner shell forming a portion of the flue, and the flue wall extending from the exhaust port to the flue input, the flue wall being between the inner shell and the outer shell forming an entirely internal component between the inner shell and the outer shell;
   a grating mounted within the body;

a handle mounted to the hood covering;
a hinge attached to both the hood covering and the body; and
a vent mounted above the exhaust port.

6. The system of claim 5 wherein the vent includes different sized openings in a transition from small openings to larger openings.

7. The system of claim 5 wherein the vent includes a vent handle.

8. The system of claim 5 wherein the flue input is positioned on a side of the flue, is an open bottom of the flue, or a combination thereof.

9. The system of claim 5 further comprising:
a leg coupled to the body; and
a wheel coupled to the leg.

10. A method of manufacturing a grilling system comprising:
providing a body;
coupling a hood covering to the body, the hood covering including an outer shell, the outer shell including an exhaust port;
coupling an inner shell to the outer shell;
attaching a flue to the outer shell, the flue including a flue wall, a flue output, and a flue input, the flue extended along an entire height of the hood covering from a bottom area of the hood covering to the exhaust port, the flue input near the bottom area of the hood covering, the exhaust port near a top of the hood covering, the inner shell forming a portion of the flue, the flue wall extending from the exhaust port to the flue input, and the flue wall being between the inner shell and the outer shell forming an entirely internal component between the inner shell and the outer shell; and
mounting a grating within the body.

11. The method of claim 10 further comprising mounting an insulation between the outer shell and the inner shell.

12. The method of claim 10 wherein attaching the flue to the outer shell includes attaching the flue having the flue input positioned above the grating.

13. The method of claim 10 wherein attaching the flue to the outer shell includes attaching the flue having the flue input positioned below the grating.

14. The method of claim 10 further comprising:
mounting a handle to the hood covering;
attaching a hinge to both the hood covering and the body; and
mounting a vent above the exhaust port.

15. The method of claim 14 wherein mounting the vent includes mounting the vent having different sized openings in a transition from small openings to larger openings.

16. The method of claim 14 wherein mounting the vent includes mounting the vent with a vent handle.

17. The method of claim 14 wherein attaching the flue to the outer shell includes attaching the flue having the flue input positioned on a side of the flue, the flue input formed as an open bottom of the flue, or a combination thereof.

18. The method of claim 14 further comprising:
coupling a leg to the body; and
coupling a wheel to the leg.

* * * * *